US007093036B2

(12) United States Patent
Raghunath et al.

(10) Patent No.: US 7,093,036 B2
(45) Date of Patent: Aug. 15, 2006

(54) PROCESSOR STATE AWARE INTERRUPTS FROM PERIPHERALS

(75) Inventors: Mandayam T. Raghunath, Fishkill, NY (US); Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 10/733,049

(22) Filed: Dec. 11, 2003

(65) Prior Publication Data

US 2005/0132096 A1    Jun. 16, 2005

(51) Int. Cl.
G06F 13/12    (2006.01)
G06F 13/24    (2006.01)
(52) U.S. Cl. ........................... 710/48; 710/267
(58) Field of Classification Search ............. None
See application file for complete search history.

(56) References Cited

U.S. PATENT DOCUMENTS 5,564,015 A * 10/1996 Bunnell ................. 714/47
6,772,260 B1 * 8/2004 Kawase et al. ........... 710/264
2004/0128563 A1 * 7/2004 Kaushik et al. ........... 713/300

* cited by examiner

Primary Examiner—Ilwoo Park
(74) Attorney, Agent, or Firm—David Aker

(57) ABSTRACT

A method, apparatus and computer product wherein interrupt thresholds are automatically adjusted based on the current state of the processor. The processor provides an output signal, possibly on one or more lines, that is indicative of the state the processor is in such as active, idle sleep. The peripherals monitor this signal and their interrupt thresholds are varied to be low when the processor is active and to be high when the processor is asleep. This causes the peripherals to delay their respective interrupts when the processor is asleep. When the processor is awakened, all peripherals requiring it may be serviced.

27 Claims, 4 Drawing Sheets

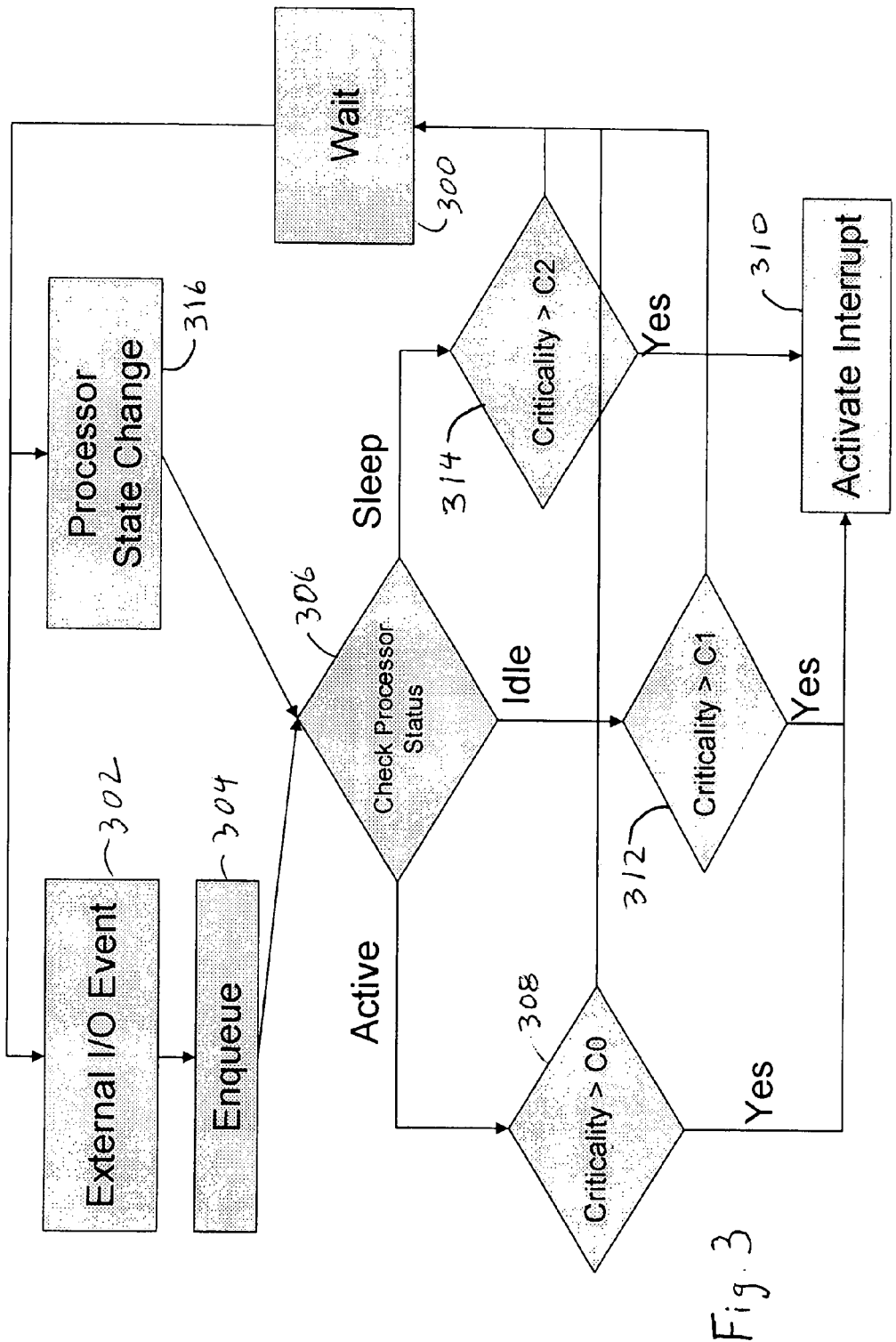

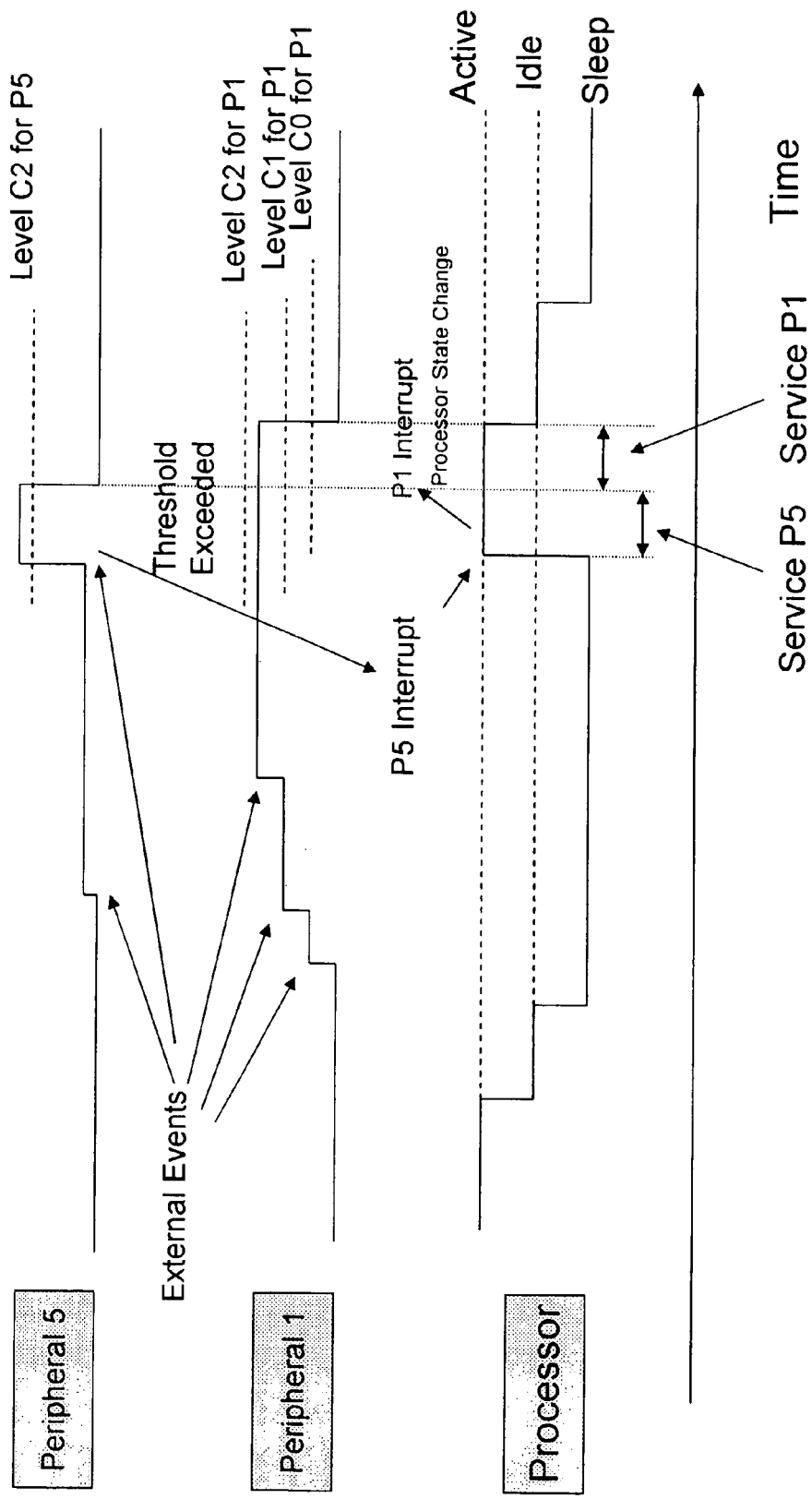
Fig. 4  Runtime Behavior

PROCESSOR STATE AWARE INTERRUPTS FROM PERIPHERALS

FIELD OF THE INVENTION

This invention is related to interrupt processing in computer systems. More particularly, it relates to interrupt processing in a manner so as to reduce power consumption and conserve processing resources.

BACKGROUND OF THE INVENTION

Currently the peripheral units in a system, activate their interrupt lines whenever they need attention from the processor without any concern for what the processor may be doing. In a low power system, the processor may be in either an active state or a low power sleep state. It usually takes a finite number of cycles for a processor to transition into the low power sleep state from the active state, and similarly a finite number of cycles to transition from the low power sleep state to the active state.

When a peripheral activates its interrupt line, the processor transitions from the low power sleep state into an active state, if it was sleeping, to respond to the interrupt. As an example, there can be two peripherals A and B, each with a separate interrupt line. When the processor is in the sleep state, if peripheral A needs attention, the voltage on its interrupt line is changed. The processor will then come out of the sleep state into the active state to handle interrupt A and after it is done, the processor goes back to sleep. A short while later peripheral B activates its interrupt line and the processor repeats the wake-up sequence to handle interrupt B. This is wasteful in terms of power consumed and system resources used.

In general many peripherals have some amount of buffering which they can use to implement a certain level of slack with respect to when they need to interrupt the processor. For example, a serial interface may have a sixteen byte first in first out (fifo) memory to hold incoming characters. The serial interface may be configured to interrupt the processor as soon as one character has come in, or may be configured to interrupt the processor when the fifo memory is half full. Other options may be possible as well. For example an interrupt can be activated after one character is received if no character is subsequently received for two character times.

Similarly, disk requests from a processor typically go into a queue. The processor sets up several disk writes and reads and triggers the disk controller. The disk controller processes elements from the queue and can interrupt the processor at different times, after each successful operation, when the queue is half empty or when the queue is fully empty.

Yet another example relates to networking. Similar to disk operations, network transfers can also be queued. The network interface has the option of interrupting the processor at different thresholds.

In some cases the changing of thresholds may affect the correctness or smooth operation of the system. For instance if the serial interface delays the delivery of incoming bytes to the processor, the processor may not acknowledge receipt of the bytes and thereby prevent the transfer of subsequent bytes on the same serial line. However in many other cases, it is acceptable to modify the thresholds where the peripherals need to signal the processor. The setting of these thresholds is often driven by optimizing some metric such as user response time or total throughput depending on whether the machine is to be used as an interactive workstation or a server.

SUMMARY OF THE INVENTION

It is an object of the present invention to service interrupts from peripherals in a manner that is conservative of energy and system resources.

It is a further object of the invention to synchronize the servicing of interrupts from peripheral devices.

It is yet another object of the invention to efficiently service interrupts form peripherals by a processor having an number of distinct processor activity states.

The present invention is based in part on the recognition that if the interrupts could be synchronized in some way, so that requests from peripherals A and B both can be handled in a single wake-up transition, the total energy consumed is lower.

In accordance with the invention, thresholds are automatically adjusted based on the current state of the processor. In particular, in a preferred embodiment, the processor provides an output signal, possibly on one or more lines, that is indicative of the state the processor is in (for example, an active state or a sleep state). The peripheral units are connected to this (or these) signal line. The peripherals monitor this signal and their interrupt thresholds are varied to be low when the processor is active and to be high when the processor is asleep. In essence what this does is cause the peripherals to delay their respective interrupts when the processor is asleep.

When the processor is asleep, all peripherals hold off their interrupts until one of them hits a high urgency threshold. This peripheral interrupts the processor waking up the processor. Once the processor is awake all other peripherals activate their interrupts if their low threshold has been crossed, effectively causing the processor to handle all of the peripherals in one wake up sequence.

This mechanism can be easily generalized to the case where the processor supports multiple low power levels, such as idle, sleep, or deep sleep. When there are more states, the processor needs to put out multiple bits of output so that the processor state can be encoded. For instance if there are four states, in a hardware embodiment of the invention, two wires are needed.

In general, peripherals are able to determine how urgent the need is for processor attention. Peripherals also monitor the processor to see what state it is in. The deeper the sleep state of the processor, the longer the peripherals hold off their interrupt i.e., they wait until their level of urgency is very high.

If a peripheral in a state of high urgency interrupts the processor and wakes it up, all peripherals which are at lower levels of urgency raise their interrupt levels asking for processor attention. This mechanism automatically aligns all interrupts, thus enabling the processor to do a great deal all in one sweep, rather than waking up repeatedly and going into deep sleep. In other words, this mechanism is automatically self synchronizing in that an awake processor automatically triggers all peripherals that may need service in the near future, to request service and thereby clear their work queues. In addition, once all the peripherals have been serviced and the processor goes to sleep, the peripherals automatically hold off on their interrupts until one of them reaches a high work threshold (high state of urgency).

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 3 is an exemplary flow chart of the operation of the system of FIG. 2.

FIG. 4 is an exemplary timing diagram of the operation of the system of FIG. 2.

DESCRIPTION OF THE INVENTION

Variations described for the present invention can be realized in any combination desirable for each particular application. Thus particular limitations, and/or embodiment enhancements described herein, which may have particular advantages to the particular application need not be used for all applications. Also, it should be realized that not all limitations need be implemented in methods, systems and/or apparatus including one or more concepts of the present invention.

Figure 1:
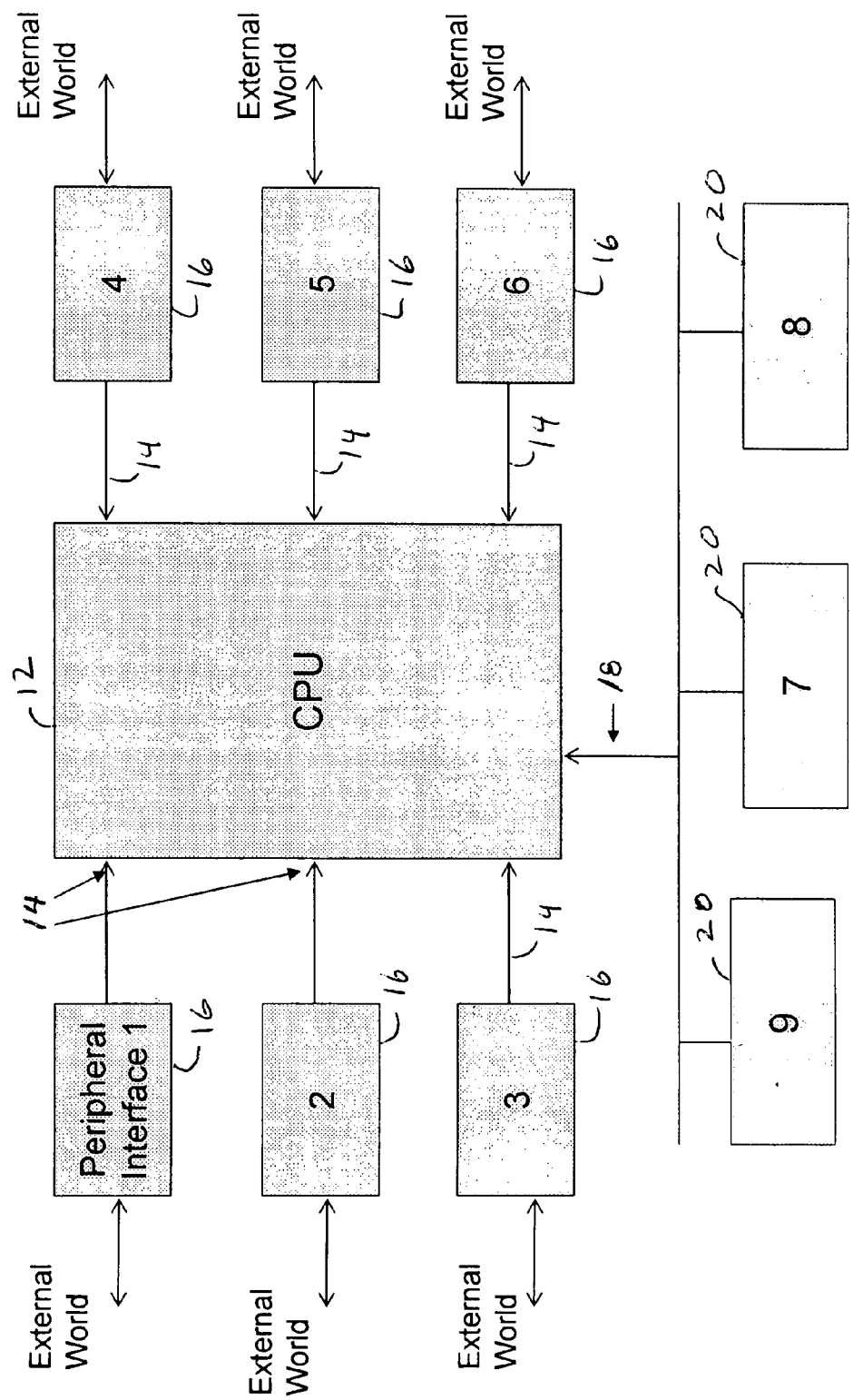
FIG. 1 is a block diagram of a prior art system.

Referring to FIG. 1, prior art computer system 10 has a main processor 12 that has multiple interrupt lines 14. Each interrupt line is assigned to a particular peripheral interface 16. A shared interrupt line 18 is shared amongst multiple peripheral interfaces 20. Each peripheral interface has connections to the external world I/O devices such as keyboard, mouse, network, disk, etc.

Figure 2:
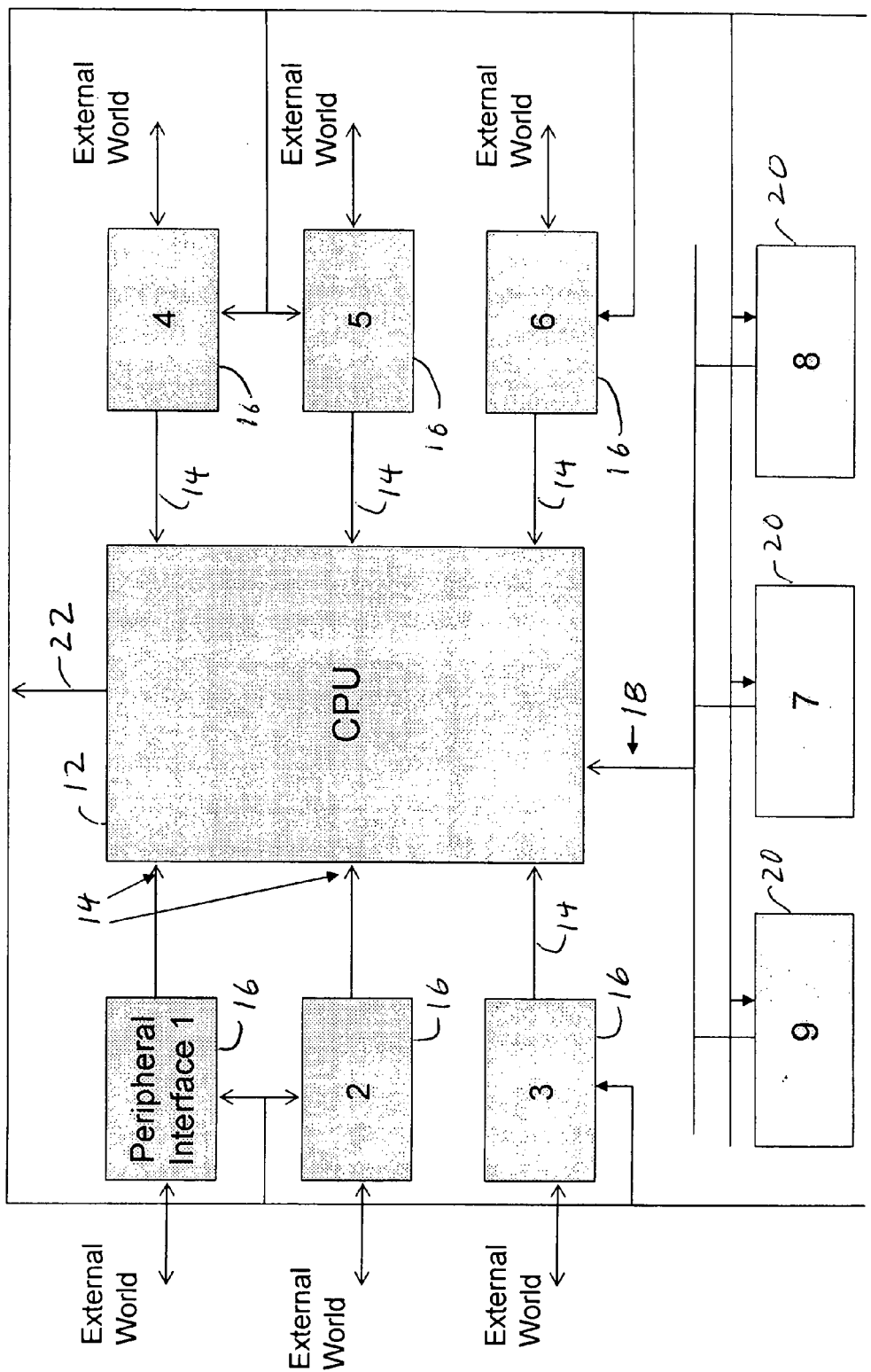
FIG. 2 is a block diagram of a system in accordance with the invention.

Referring to FIG. 2, in accordance with the invention, the structure of FIG. 1 is enhanced by adding one (or more) lines, as represented by 22, that are output from the processor and that indicate its current state. If the processor can be in more than two states, one line or wire may be inadequate. If the processor can be in the states of "Active", "Idle", "Sleep" two lines having only binary outputs (a "1" or a "0") thereon are needed to indicate one of three possible states. These lines are connected to all the peripheral interfaces 16 and 20, thus supplying information to the interfaces to determine the current state of the processor at any point in time by determining the potentials on these lines.

Referring to FIG. 3, each peripheral interface goes through the flow chart that is presented. Normally the peripheral interface is waiting 300 for something to happen. If it sees an external I/O event 302, it first enqueues the event 304 and checks the current processor state 306. As explained above, each I/O event has some effect on or internally changes the state of the interface to some level of criticality C0, C1, C2, etc., where C0 is less than C1, which is in turn less than C2. Based on the current processor state determined at 306, the peripheral unit compares its internal level of criticality against different thresholds C0, C1 or C2 as appropriate. If the processor is active, then any criticality greater than C0, at 308, will activate an interrupt for that processor at 310. If the processor is in an idle state, then any criticality greater than C1, at 312, will activate an interrupt for the processor at 310. If the processor is in a sleep state, then any criticality greater than C2, at 314, will activate an interrupt for the processor at 310. In short, if the level of criticality is higher than the appropriate threshold, the peripheral interface activates its interrupt line asking for the processor to service the interface. If the criticality is lower than the threshold, the interface does nothing and waiting 300 continues. If the processor changes its state 316 (perhaps due to some other peripheral interface interrupting the processor), the peripheral interface in question detects this and then again runs the threshold checker at 306. The threshold of interest may have become lower due to the processor being in a more "awake" state. If this is the case, the peripheral unit activates its interrupt line.

FIG. 4 shows a sample runtime behavior. Going forward in time, from left to right, the processor transitions from active to idle and finally to sleep since it has nothing to do. When the processor is in the sleep state, external events occur on Peripheral Interface 1 that raise its level of criticality gradually, but the level of criticality does not exceed the Sleep state threshold (C2) for Peripheral Interface 1. An event occurs on P5 that raises its criticality level but this is still lower than C2 for P5. Finally another event occurs on Peripheral Interface 5 that puts it above its threshold C2 causing it to activate its interrupt line. The processor immediately wakes up and services Peripheral Interface 5. As it wakes up, the processor's state goes to "Active", causing P1 to reevaluate. Now since its level of criticality is higher than C0, it activates its interrupt line. After the processor has completed servicing P5 it services Peripheral Interface 1. As each peripheral unit is serviced, its level of criticality drops to zero. Finally the processor has completed all its activity and it drops to the idle state for some, generally predetermined, period of time. After a time-out period has elapsed the processor drops down to the even lower powered sleep state.

The net effect of all of these changes is that the processor is awakened less frequently from its lowest power state and can save more energy because of that. It also ensures that when the processor wakes up, it deals with all the peripherals in quick succession thereby amortizing the cost of state transitions.

While an implementation of the invention has been shown which uses one or more signal lines, it will understood by one skilled in the art that the activity state of the processor may also be supplied to the peripherals by sending specifically coded digital information along one or more existing communication lines between the processor and the peripheral. For example at least one output word may be generated by the processor and communicated to the peripherals, which is indicative of the activity state of the processor. Thus, the invention may be implemented without adding additional hardware signal outputs from the processor. One possible approach is to modify existing peripheral firmware to be responsive to digital words from the processor indicative of the activity state of the processor, and to internally store the processor state and any changes to the processor state, in responsive to the digital word on the existing communication lines.

The present invention can be realised in hardware, software, or a combination of hardware and software. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. The concepts of this invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art. Thus, it should be understood that the embodiments has been provided as an example and not as a limitation. The scope of the invention is defined by the appended claims.

The invention claimed is:

1. In a computer system having a processor with a plurality of activity states, and a plurality of peripheral devices in operative relation with the processor, wherein each peripheral device has a plurality of urgency states, a method of operating the computer system comprising:
communicating an activity state of the processor to the peripheral devices;
evaluating an activity state of the processor against an urgency state of a peripheral device to determine whether said peripheral device issues an interrupt, wherein if said urgency state of a peripheral device is high, said peripheral device issues an interrupt to said processor regardless of said activity state of said processor;
issuing interrupt requests to said processor from all peripheral devices which need to be serviced, when an interrupt has been issued to said processor by one of said peripheral devices; and
servicing all of said interrupt requests by said processor.

2. A method as recited in claim 1, further comprising:
supplying an interrupt from the peripheral devices to the processor when the processor changes activity states from a first activity state to a second activity state.

3. A method as recited in claim 2, further comprising detection of the activity state of the processor by the peripheral devices before said interrupt is supplied.

4. A method as recited in claim 2, wherein the peripheral devices have a plurality of urgency states and an activity state of the processor is evaluated against an urgency state of a peripheral device to determine whether said peripheral device issues an interrupt.

5. A method as recited in claim 4, wherein if said urgency state of a peripheral device is low, said peripheral device issues an interrupt to said processor only if said activity state of said processor is other than low.

6. A method as recited in claim 1, further comprising setting the urgency level of each of the peripherals that have been serviced to a lowest urgency level after the peripheral has been serviced.

7. A method as recited in claim 1, wherein the activity states of the processor are represented by at least one bit output of the processor.

8. A method as recited in claim 1, wherein the activity states of the processor are represented by at least one output word generated by the processor.

9. A method as recited in claim 1, wherein the activity state of the processor is communicated as being in a state selected from active, idle and sleep.

10. A computer system having a processor with a plurality of activity states, and a plurality of peripheral devices in operative relation with the processor, wherein each peripheral device has a plurality of urgency states, the computer system comprising:
means for communicating an activity state of the processor to the peripheral devices;
means for evaluating an activity state of the processor against an urgency state of a peripheral device to determine whether said peripheral device issues an interrupt, wherein if said urgency state of a peripheral device is high, said peripheral device issues an interrupt to said processor regardless of said activity state of said processor; and
means associated with each of said peripheral devices for detecting when an interrupt has been issued to said processor by one of said peripheral devices, and for issuing an interrupt request to said processor if said peripheral device needs to be serviced;
wherein said processor servicing all of said interrupt requests from peripheral devices needing to be serviced.

11. A system as recited in claim 10, further comprising means for supplying an interrupt from the peripheral devices to the processor when the processor changes activity states from a first activity state to a second activity state.

12. A system as recited in claim 11, further comprising detection means associated with the peripheral devices for detecting the activity state of the processor before said interrupt is supplied.

13. A system as recited in claim 11, wherein the peripheral devices have a plurality of urgency states, further comprising means for evaluating an activity state of the processor against an urgency state of a peripheral device to determine whether said peripheral device issues an interrupt.

14. A system as recited in claim 13, wherein if said urgency state of a peripheral device is low, said peripheral device issues an interrupt to said processor only if said activity state of said processor is other than low.

15. A system as recited in claim 10, further comprising:
means for setting the urgency level of each of the peripherals that have been serviced to a lowest urgency level after the peripheral has been serviced.

16. A system as recited in claim 1, wherein the activity states of the processor are represented by at least one bit output of the processor.

17. A system as recited in claim 1, wherein the activity states of the processor are represented by at least one output word generated by the processor.

18. A system as recited in claim 1, wherein the processor has activity states selected from active, idle and sleep.

19. A computer program product comprising a computer usable medium having computer readable program code means embodied therein for causing the computer to effect a method for operating the computer system to service interrupts from a plurality of peripheral devices in operative relation with a processor having a plurality of activity states, the method comprising:
communicating an activity state of the processor to the peripheral devices;
evaluating an activity state of the processor against an urgency state of a peripheral device to determine whether said peripheral device issues an interrupt, wherein if said urgency state of a peripheral device is high, said peripheral device issues an interrupt to said processor regardless of said activity state of said processor;
issuing interrupt requests to said processor from all peripheral devices which need to be serviced, when an interrupt has been issued to said processor by one of said peripheral devices; and
servicing all of said interrupt requests by said processor.

20. A computer program product as recited in claim 19, further comprising computer readable program code means embodied therein for causing the computer to supply an interrupt from the peripheral devices to the processor, when the processor changes activity states from a first activity state to a second activity state.

21. A computer program product as recited in claim 20, wherein the peripheral has a plurality of urgency states, further comprising computer readable program code for evaluating an activity state of the processor against the urgency state of a peripheral device, to determine whether said peripheral device issues an interrupt.

22. A computer program product as recited in claim 21, wherein if said urgency state of a peripheral device is low, said peripheral device issues an interrupt to said processor only if said activity state of said processor is other than low.

23. A computer program product as recited in claim 19, further comprising computer readable program code means embodied therein for detecting the activity state of the processor.

24. A computer program product as recited in claim 19, further comprising computer readable program code for setting the urgency level of each of the peripherals that have been serviced to a lowest urgency level after the peripheral has been serviced.

25. A computer program product as recited in claim 19, comprising computer readable program code wherein the activity states of the processor are represented by at least one bit output of the processor.

26. A computer program product as recited in claim 19, further comprising computer readable program code wherein the activity states of the processor are represented by at least one output word generated by the processor.

27. A computer program product as recited in claim 19, comprising computer readable program code for detecting the processor state as a state selected from active, idle and sleep.

* * * * *